(No Model.)

C. L. COFFIN.
METHOD OF WELDING METALS ELECTRICALLY.

No. 442,954. Patented Dec. 16, 1890.

Witnesses
Inventor
Charles L. Coffin

UNITED STATES PATENT OFFICE.

CHARLES L. COFFIN, OF DETROIT, MICHIGAN.

METHOD OF WELDING METALS ELECTRICALLY.

SPECIFICATION forming part of Letters Patent No. 442,954, dated December 16, 1890.

Application filed June 9, 1890. Serial No. 354,732. (No model.)

*To all whom it may concern:*

Be it known that I, CHARLES L. COFFIN, of Detroit, in the county of Wayne and State of Michigan, have invented a new and useful Improvement in the Process of Welding Metals Electrically, of which the following is a specification.

My invention consists in an improved process of welding metals electrically, hereinafter fully described and claimed.

Figure 2:
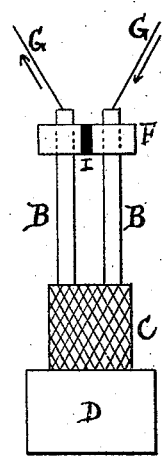
Figure 1:
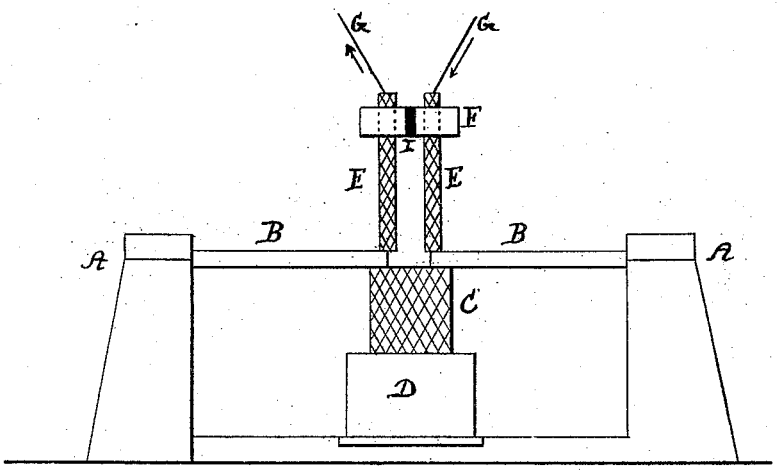

In the drawings, Figure 1 is a diagrammatic view illustrating one manner of carrying out my process. Fig. 2 is a similar view illustrating a modification.

A A represent clamps which hold the articles (illustrated as metal rods B B) to be worked.

D represents a base, on which is set (but insulated therefrom) a conductor C, preferably of refractory material, such as carbon. The ends of the rods B which are to be heated lie on block C.

E E represent carbons held in a clamp F, but insulated from each other by the insulation I, each of which is connected by a conductor G with one pole of a generator of electricty. The lower ends of carbons E E rest on the ends of rods B, thus establishing an electric circuit through said carbons, the ends of rods B B, and the carbon block C.

The carbons E E may be omitted and the conductors G G connected directly with the ends of the rods B B, in which case said rods are electrically connected by block C, with which their ends are in contact.

The operation of my invention is that by passing a heating current of electricity through the conductors G the ends of rods B, which are in contact with the carbon block C, become heated, when they may be welded together by pressure or worked in any other desired way.

What I claim as my invention, and desire to secure by Letters Patent, is—

1. The herein-described method of electrically welding metals, consisting in connecting each article with one pole of a generator of electricity, making contact between the ends to be welded and an electric conductor of equal or less resistance, passing a heating current through said articles and said conductor, and completing the weld by pressure.

2. The herein-described method of working metals electrically, consisting in connecting each article with one pole of a generator of electricity, making contact between the ends to be welded and an electrical conductor of equal or less resistance and passing a heating current through said articles and said conductor.

CHARLES L. COFFIN.

Witnesses:
CYRUS E. LOTHROP,
GERTRUDE H. ANDERSON.